UNITED STATES PATENT OFFICE.

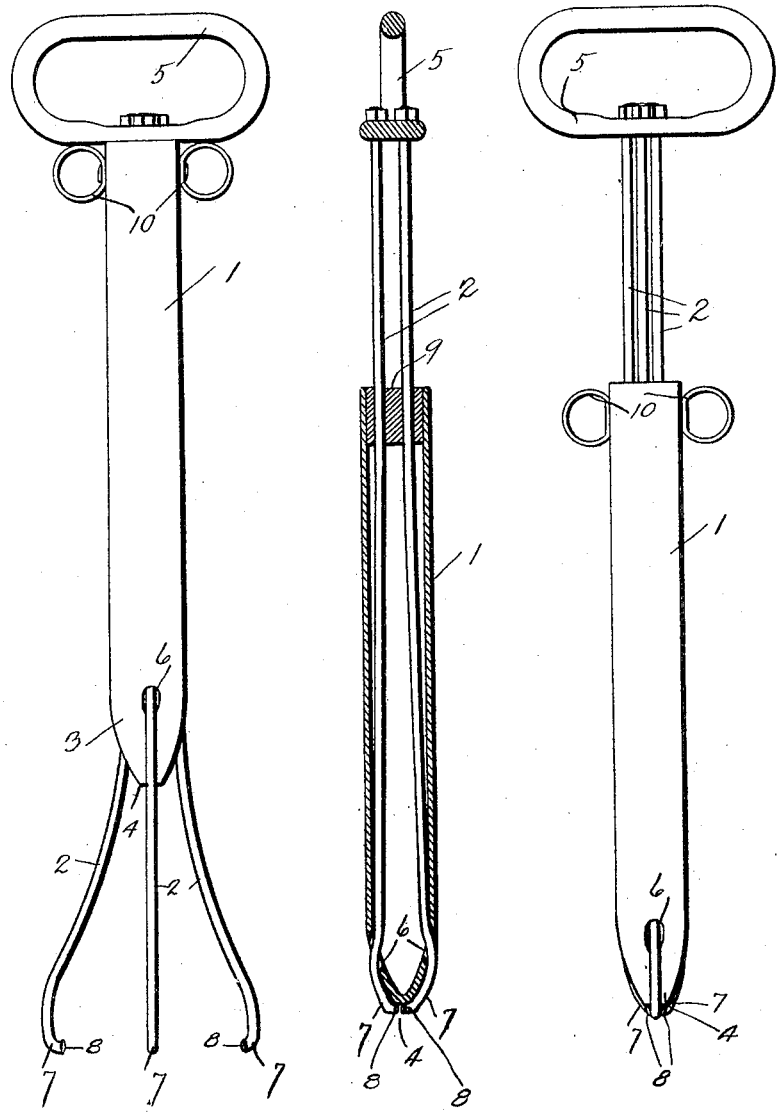

SAMUEL BROWER, WILLIAM BROWER, AND GEORGE LATTA, OF MANLIUS, ILLINOIS.

VETERINARY FORCEPS.

No. 804,094.　　　Specification of Letters Patent.　　　Patented Nov. 7, 1905.

Application filed July 6, 1905. Serial No. 268,307.

*To all whom it may concern:*

Be it known that we, SAMUEL BROWER, WILLIAM BROWER, and GEORGE LATTA, citizens of the United States, residing at Manlius, in the county of Bureau and State of Illinois, have invented certain new and useful Improvements in Veterinary Forceps; and we do declare the following to be a full, clear, and exact description of the invention, such as will enable others skilled in the art to which it appertains to make and use the same.

This invention relates to veterinary forceps designed for use in aiding the delivery of hogs and sheep; and one of the principal objects of the same is to provide an instrument which will occupy but small space when in its retracted position and which will provide a series of open arms when in extended position.

Another object is to provide an instrument of this character which shall be simple in construction, efficient in use, and which will be easy and reliable in operation.

These and other objects are attained by means of the construction illustrated in the accompanying drawings, in which—

Figure 1 is a side view of an instrument made in accordance with our invention, the arms being in retracted position. Fig. 2 is a similar view with the arms in extended position, and Fig. 3 is a longitudinal section of the forceps.

Referring to the drawings for a more particular description of our invention, the numeral 1 designates a tubular casing designed to contain the spring-arms 2. The casing 1 is tapered off, as at 3, at one end and is provided with a closed and flat terminal point 4. The spring-arms 2 are secured at one end to a handle 5, said arms extending through the casing 1 and out through perforations 6 near the outer end of said casing. The projecting ends 7 of the arms 2 diverge when in the extended position shown in Fig. 2. When the handle 5 is drawn outward, the arms 2 are retracted within the casing 1, and the inwardly-bent terminal ends 8 of the arms 2 then rest against the flat terminal point 4 of the casing. In this condition the instrument occupies but little space and can be readily inserted for use. There are three arms 2 shown in the drawings, and this is the number found to be efficient for our purpose. However, two or more arms could be advantageously used in an instrument of this kind. The arms 2 pass through a plug 9, fitted in the outer end of the casing 1, and the apertures in said plug form guideways for said arms and insure a smooth operation of the parts. At the sides of the casing 1 oppositely-disposed finger-holds 10 are provided.

From the foregoing the construction and operation of our invention will be understood without further description.

Various changes in the form, proportion, and the minor details of construction may be resorted to without departing from the principle or sacrificing any of the advantages of this invention.

Having thus described our invention, what we claim as new, and desire to secure by Letters Patent, is—

1. In an instrument of the character described, a tubular casing having a tapered end terminating in a flat portion, a handle, spring-arms secured to said handle and passing through the casing, said arms having diverging ends terminating in inwardly-extending jaws, substantially as described.

2. A veterinary forceps comprising a tubular casing having a tapered and flattened end, a handle, spring-arms attached to said handle, a guide-plug in the casing through which the spring-arms extend, said spring-arms having diverging outer portions and inwardly-bent terminal ends adapted to rest upon the flat end of the casing when said arms are in retracted condition, and handholds at the sides of said casing near its outer end, substantially as described.

In testimony whereof we have hereunto set our hands in presence of two subscribing witnesses.

SAMUEL BROWER.
　　　　　　　　WILLIAM BROWER.
　　　　　　　　GEORGE LATTA.

Witnesses:
　ERNEST ROCKWELL,
　LEWIS GLAFKA.